Dec. 17, 1935.   E. LATSHAW   2,024,375
WHEEL
Filed Dec. 13, 1934
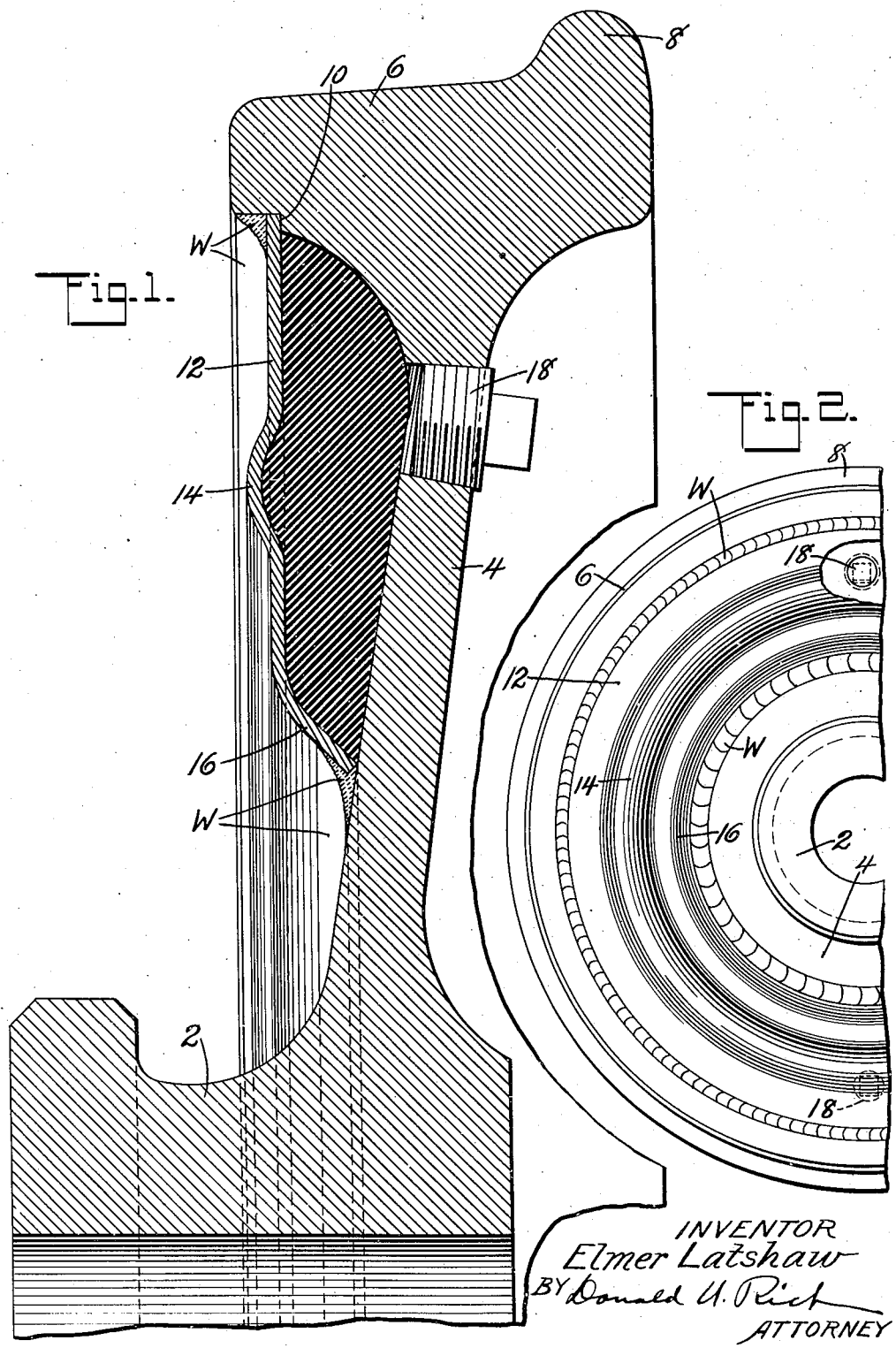
INVENTOR
Elmer Latshaw
BY Donald U. Rich
ATTORNEY Patented Dec. 17, 1935

2,024,375

UNITED STATES PATENT OFFICE 2,024,375

WHEEL

Elmer Latshaw, Philadelphia, Pa., assignor to The J. G. Brill Company, Philadelphia, Pa., a corporation of Pennsylvania Application December 13, 1934, Serial No. 757,253

2 Claims. (Cl. 295—7)

This invention is directed to improving wheels especially car wheels and may be used in connection with either new or old wheels.

The present trend in car building whether it be new or old is toward the elimination of unnecessary noise. It has previously been proposed to eliminate wheel noises by the use of rubber but this necessitated the use of a special wheel and in the majority of instances the braking and driving forces were transmitted through the rubber which is undesirable and in fact impractical for heavy wheel loads. Likewise the use of lead or other soft metal formed in a ring and applied to the wheel has been tried but it is extremely hard to attach such soft metal to cast iron or steel wheels.

It is therefore an object of this invention to provide a construction that may be applied to new or old wheels with equal facility.

It is another object of this invention to provide means of substantially the same material as the wheel which may be permanently attached to previously formed wheels.

It is also an object of this invention to rigidly attach means to the car wheel to provide an annular space that may be filled with non-resonant material.

It is a still further object of this invention to provide effective sound deadening means for the web and tread of a wheel which will not decrease the wheel strength.

These and further objects will be apparent to one skilled in the art from a study of the accompanying description and drawing in which:

Figure 1 is a sectional view of one-half of a car wheel showing the invention applied thereto;

Fig. 2 is an elevation of one-half of the car wheel looking toward the attached metal plate.

In the drawing the car wheel is shown as of the conventional form having the hub portion 2 adapted to fit the car axle and with the web portion 4 carrying the tread 6 and flange 8. The wheel as shown is of the solid web type but if a spoked wheel is used the spaces between the spokes may be closed by the welding in of plates.

The wheel rim is shown as provided with a shoulder 10 on the inside of the wheel adapted to support a disc 12 of suitable form welded as at W to the rim to form an air tight joint. The metal disc is provided with a corrugation 14 intermediate its edges and with an angular portion 16 at the inner edge directed toward the wheel web to which it is welded in air tight relation at W. It is thus seen that an air tight annular space is provided adjacent the rim and web of the wheel.

The wheel web is drilled and tapped at diametrically opposite points to receive plugs 18 and also testing connections (not shown) since it is advisable to test the construction for any possible leaks.

In order to fill the annular space the wheel is laid down with the plug holes upward and a non-resonant material poured or forced into one of the holes, the trapped air escaping through the other hole. As soon as the space is completely filled with material the plugs are screwed down tight and for added safety may be spot welded in place. The non-resonant material is preferably of such a nature that it is semi-solid at ordinary temperatures and fairly liquid at high temperatures permitting of easy pouring and with minimum contraction on cooling. In practice Crater compound, which is a heavy, sticky, semi-solid lubricating mixture, has been found very satisfactory although asphalt, tar or other substances would be equally useful in deadening the wheel vibrations.

It is to be noted that the construction may be applied to new or old wheels without effecting the wheel strength in the least and that the provision of the corrugation 14 prevents any strain being placed on the wheel due to heating of the wheel caused by the brakes. The corrugation also permits of the disc springing to take care of contraction of the filling material upon cooling or its expansion upon being heated.

Although one form of the invention has been shown and described and only a few of the filling substances mentioned, various other forms and substances may be used without departing from the scope of the appended claims.

What is claimed is:

1. A car wheel including a hub, a rim, a web merging with and joining said hub and rim, a wall attached to the rim and web and forming a chamber therewith for the reception of sound deadening material, said wall being so constructed and arranged that the expansion and contraction of said sound deadening material will distort said wall without displacement of same at its junctions at the rim and web.

2. In a car wheel including a hub, a rim, a web connecting said hub and rim, a wall formed with an annular corrugation attached to the rim and web and forming a chamber therewith for the reception of sound deadening material, said web having an opening leading to the chamber, and a closure for said opening.

ELMER LATSHAW.